(12) United States Patent
Kim

(10) Patent No.: US 8,353,631 B2
(45) Date of Patent: Jan. 15, 2013

(54) JOURNAL-FOIL AIR BEARING

(75) Inventor: Kyeong Su Kim, Daejeon (KR)

(73) Assignee: Neuros Co., Ltd., Daejeon (KR)

( * ) Notice: Subject to any disclaimer, the term of this patent is extended or adjusted under 35 U.S.C. 154(b) by 672 days.

(21) Appl. No.: 12/568,701

(22) Filed: Sep. 29, 2009

(65) Prior Publication Data
US 2011/0052110 A1    Mar. 3, 2011

(30) Foreign Application Priority Data

Aug. 31, 2009  (KR) .................. 10-2009-0081103

(51) Int. Cl.
*F16C 32/06* (2006.01)
(52) U.S. Cl. .............. 384/103; 384/104; 384/106
(58) Field of Classification Search .......... 384/100, 384/103, 104, 105, 106
See application file for complete search history.

(56) References Cited

U.S. PATENT DOCUMENTS

| | | | |
|---|---|---|---|
| 4,549,821 A * | 10/1985 | Kawakami | 384/103 |
| 6,964,522 B2 | 11/2005 | Kang et al. | |
| 7,070,330 B2 * | 7/2006 | Agrawal | 384/106 |
| 2002/0054718 A1 | 5/2002 | Weissert | |
| 2007/0047858 A1 * | 3/2007 | Hurley et al. | 384/106 |
| 2007/0069597 A1 * | 3/2007 | Taniguchi et al. | 310/90.5 |
| 2008/0310779 A1 | 12/2008 | Agrawal et al. | |

FOREIGN PATENT DOCUMENTS

| | | |
|---|---|---|
| JP | 2001295836 A | 10/2001 |
| KR | 20090075272 A | 7/2009 |
| WO | 2011/025087 A1 | 3/2011 |

OTHER PUBLICATIONS

Written Opinion and International Search Report for PCT/KR2009/006275, dated Sep. 27, 2010.

* cited by examiner

*Primary Examiner* — Phillip A Johnson
(74) *Attorney, Agent, or Firm* — Bachman & LaPointe, P.C.

(57) ABSTRACT

A journal foil air bearing 5000 according to the present invention is provided with one top foil 300 along an inner periphery of a hole 18 of a bearing housing 10. Bump foils 20c and 20d are installed at the inner periphery of the hole 18 of the bearing housing 10 where they are distanced from each other. Both ends of the top foil 300 form bent portions 308a and 308b and the bent portions 308a and 308b are mounted in a slot 414 of a slot body 40 mounted in a slot 140 provided in the inner periphery of the hole 18 in the bearing housing 10 and the top foil 300 is elastically movable therein.

11 Claims, 9 Drawing Sheets

JOURNAL-FOIL AIR BEARING

FIELD OF THE INVENTION

The present invention relates to a journal foil air bearing.

BACKGROUND

A foil air bearing is a bearing which supports loads by air pressure generated by the incoming air having viscosity between a rotor or a bearing disc and a foil contacting therewith at high speed rotation of the rotor.

Among the foil air bearing, the journal foil air bearing may generate the dynamic instability of the rotor-bearing system at high speed. That is, when rotor rotates at high speed, the dynamic characteristic becomes unstable and problems such as vibration may arise.

The dynamic instability may be caused by the unintended pressure distribution between the rotor and the foil and be affected by the friction damping of the foil structure or the unbalanced mass of the rotor. This dynamic instability harms the stable operation of the rotor and should be solved.

Generally, the journal foil air bearing is composed of one bump foil and one top foil or three bump foils and three top foils.

Among them, it is known that the journal foil air bearing composed of the three bump foils and three top foils is advantageous in view of the load capability and dynamic stability. However, in this case, the number of bearing components increases and the production cost rises, the three bump foils and the three top foils should have all the same tolerance, and all the fixed portions of the three top foils are exposed to the rotor so that the reliability of the fixed portion should be secured.

SUMMARY

Accordingly, it may be advantageous to reduce the number of foils and, especially, to reduce the number of the top foils in view of securing the reliability of the fixed portion of the top foil.

In a general journal foil air bearing, one end of the top foil is fixed to the inner periphery of the hole of the bearing housing and the other end is not fixed constituting a free end so that the top foil can elastically expand or shrink in its radius along its circular shape. There exists considerable friction, which generates tangential force on the top foil, between the rotor and the coat on the top foil when rotor speed starts to rotate below lift off speed. This means that the top foil should be installed that it can expand as to the rotation direction of the rotor. If the top foil is installed in reverse to the rotation direction of the rotor, the gap between the rotor and the top foil reduces as the rotor rotates and the rotor may fail to rotate and the bearing may be damaged. By this, the gap between the rotor and the top foil increases as the rotor rotates at high speed and the thermal deformation and the pressure generated between the rotor and the top foil can be accommodated.

Accordingly, there is a need for a top foil structure which permits the rotation of the rotor in both directions. In this case, the aforementioned problem is solved and the assembly and the installation become facilitated since it is not necessary to install the top foil to correspond to the predetermined rotation direction, the management becomes easy, and the possibility of the damage of the bearing is diminished.

Therefore, it is desirable that one top foil structure is provided so that the number of components reduces and the exposure of the fixed portion of the top foil is minimized.

Upon this ground, if the dynamic instability of the rotor at the high speed is solved and the rotation of the rotor in both directions is permitted, it is more desirable. In another aspect, lobes may be generated on the top foil to solve the dynamic instability of the rotor at high speed. In this case, if the number, the size and the location of the lobes are easily adjustable, it is desirable. The present invention may satisfy some or all these demands.

Technical Problem

A purpose of the present invention is to provide a journal foil air bearing structure which provides one top foil structure to reduce the number of components and minimize the exposure of a fixed portion of the top foil and solves the dynamic instability of a rotor at high speed. Also, a purpose of the present invention is to provide a journal foil air bearing structure which provides one top foil structure to reduce the number of components and minimize the exposure of a fixed portion of the top foil and permits the rotation of the rotor in both directions. Furthermore, a purpose of the present invention is to provide a journal foil air bearing structure which provides one top foil structure to reduce the number of components and minimize the exposure of a fixed portion of the top foil, solves the dynamic instability of a rotor at high speed and permits the rotation of the rotor in both directions. Meanwhile, in another aspect of the present invention, a purpose of the present invention is to provide a journal foil air bearing which can easily adjust number, size and location of lobes provided to solve the dynamic instability of the rotor at the high speed.

Technical Solution

The present invention provides a journal foil air bearing comprising: a bearing housing provided with a hole in which a rotor is arranged; at least two bump foils disposed to be distanced from each other along an inner periphery of the hole in the bearing housing; and a top foil provided by one foil along a circumferential direction and disposed along the top of the bump foils; whereby the top foil deforms outward in spaces where the bump foils are distanced from each other and forms lobe shapes thereon at high speed rotation of the rotor.

According to the present invention, it is desirable if a peripheral distance where a bump is not formed between the bump foils is determined by multiplication of a radius of the hole in the bearing housing and degree of an angle formed by spots at which the bump ends in the adjacent bump foils with respect to center of the hole and the degree of an angle lies between 5° and 45°.

According to the present invention, a plurality of said top foils may be provided along a radial direction laid one upon another.

According to the present invention, it is desirable that the top foil has bent portions at both ends and the bent portions are mounted in a slot provided in the inner periphery of the hole in the bearing housing to be elastically movable therein in the circumferential and radial directions.

According to the present invention, it is desirable that the top foil is installed in such a way that both bent portions face and contact each other in the slot and the top foil is symmetrical with respect to the bent portions.

According to the present invention, it is desirable that a slot body having a slot is mounted in the slot in the inner periphery of the hole in the bearing housing and the bent portions at both ends of the top foil are mounted in the slot in the slot body and, at this time, clearances are formed in the slot in the slot body where the bent portions can move elastically in the circumferential and radial directions.

According to the present invention, it is desirable that the slot body and a bent portion of an end of the bump foil are inserted into and mounted in the slot in the inner periphery of the hole in the bearing housing to be in contact with each other and a clearance is formed in the slot in the inner periphery of the hole in the bearing housing so that the slot body can move elastically in the circumferential direction.

According to another aspect of the present invention, the present invention provides a journal foil air bearing comprising: a bearing housing provided with a hole in which a rotor is arranged; a bump foil disposed along an inner periphery of the hole in the bearing housing; and a top foil provided by one foil along a circumferential direction and disposed along the top of the bump foil; wherein the top foil has bends in both ends and the bent portions are mounted on a slot provided in the inner periphery of the hole in the bearing housing to be elastically movable therein in circumferential and radial directions.

According to the present invention, it is desirable that the top foil is installed in such a way that both bent portions face and contact each other in the slot and the top foil is symmetrical with respect to the bent portions.

According to the present invention, it is desirable that a slot body having a slot is mounted in the slot in the inner periphery of the hole in the bearing housing and the bent portions at both ends of the top foil are mounted in the slot in the slot body and, at this time, clearances are formed in the slot in the slot body so that the bent portions can move elastically in the circumferential and radial directions.

According to the present invention, it is desirable that the slot body and a bent portion of an end of the bump foil are inserted into and mounted in the slot in the inner periphery of the hole in the bearing housing to be in contact with each other and a clearance is formed in the slot in the inner periphery of the hole in the bearing housing so that the slot body can move elastically in the circumferential direction.

According to the present invention, it is desirable if a plurality of said top foils is provided along a radial direction laid one upon another.

Advantageous Effects

The present invention may provide a journal foil air bearing which provides one top foil structure not only to reduce the number of components and minimize the exposure of a fixed portion of the top foil, but also to permit the rotation of the rotor in both directions. Accordingly, it is possible to provide facilities in assemblies and installation and prevent the bearing from being damaged by the rotation of the rotor in the unintended direction. Also the present invention may provide a journal foil air bearing which provides a bump foil structure to generate lobes to enhance the dynamic stability of the rotor-bearing system at high speed. Meanwhile, the present invention may provide a journal foil air bearing which can easily adjust number, size and locations of lobes provided to enhance the dynamic stability of the rotor at the high speed.

DETAILED DESCRIPTION

Now, the preferred embodiment of the present invention will be explained with reference to the drawings.

Figure 1:
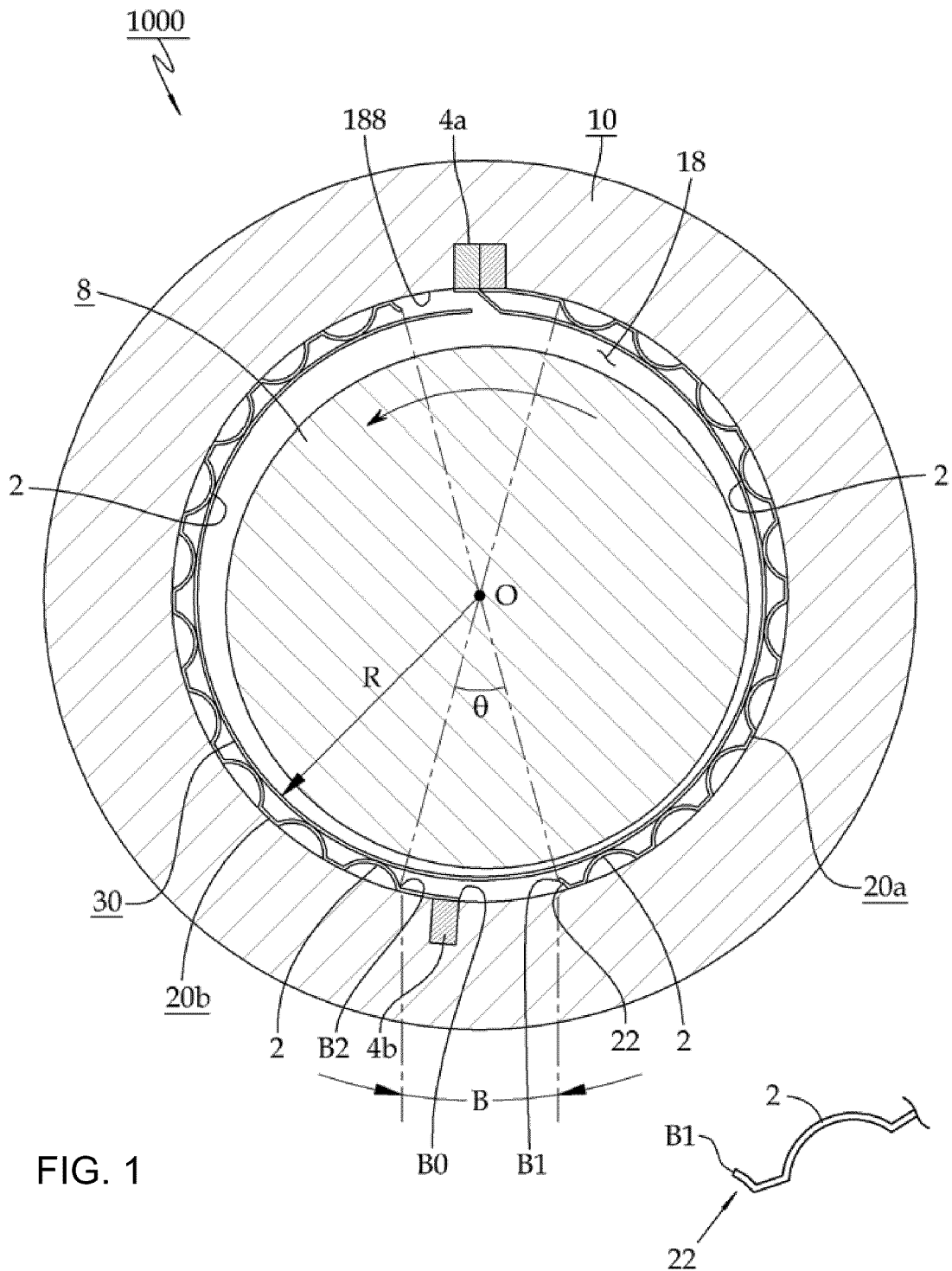
FIGS. 1 and 2 show the structure of a journal foil air bearing in accordance with the first embodiment of the present invention.

FIG. 1 shows a journal foil air bearing 1000 in accordance with the first embodiment of the present invention.

As shown, a bearing housing 10 is provided and the bearing housing 10 has a hole 18 in which a rotor 8 is disposed.

Bump foils are disposed along the inner periphery 188 of the hole 18 in the bearing housing 10 and a top foil is disposed along the top of the bump foils.

According to some embodiments of the present invention, at least two bump foils are provided along the inner periphery of the hole of the bearing housing and they are distanced from each other. Also, only one top foil is provided. As described later, the top foil is provided by one along circumferential direction. However, more than one may be laid one upon another along radial direction to increase the damping.

In this embodiment, two bump foils are provided along the inner periphery 188 of the hole 18 of the bearing housing 10. One 20a and the other 20b are installed at a spacer block 4a and a spacer block 4b by spot welding, respectively.

A top foil 30 is disposed along the top of the bump foils 20a and 20b and it is formed by one foil along the inner periphery of the top of the bump foils 20a and 20b (i.e., to span the gap therebetween). An edge of an end of the top foil 30 is secured to the spacer block 4a by spot welding and the other end forms a free end.

As shown, the bump foils 20a and 20b are distanced from each other along the inner periphery 188 of the hole 18 in the bearing housing 10. Accordingly, as the rotor 8 rotates at high speed, the top foil 30 deforms outward at the spaces where the bump foils 20a and 20b are distanced from each other and forms lobe shapes thereon by the pressure built up in the hole 18.

That is, because the portions of the top foil 30 at the spaces where a bump 2 is not formed between the bump foils 20a and 20b are not supported by the bump 2, the portions of the top foil 30 at the spaces are deformed into lobe shapes by the air pressure built up in the hole 18. (Refer to FIG. 2).

At this time, the peripheral distance B where a bump 2 is not formed between the bump foils 20a and 20b is determined by the multiplication of the radius R of the hole 18 in the bearing housing 10 and degree of an angle θ formed by spots B1 and B2 at which the bump 2 ends in the adjacent bump foils 20a and 20b with respect to the center O of the hole 18. It is desirable that the degree of the angle θ lies between 5° and 45°.

If the degree of the angle θ is smaller than 5°, the deformation into lobe shape is so small that the effect is minimal. If the degree of the angle θ is over 45°, the air pressure generated on the top foil 30 is too reduced and the load capacity of the bearing is too lowered.

In this case, the spot at which bump 2 ends on the bump foil 20a is B1 which is the end of a partial bump 22. The end B0 of the bump foil 20b is not the spot at which the bump 2 ends but the end of the edge and it cannot be the reference.

Figure 2:
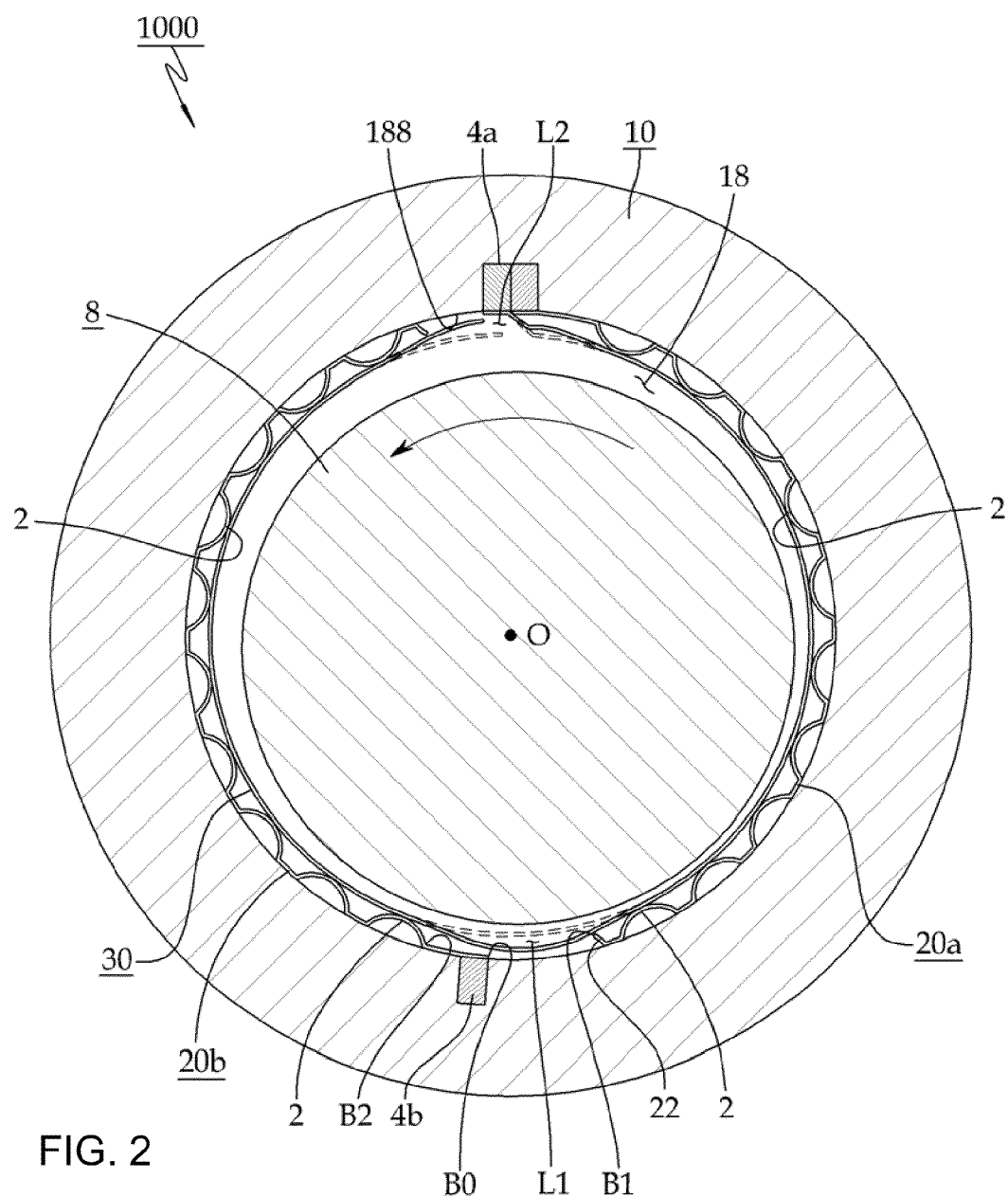

FIG. 2 shows that the lobes L1 and L2 are generated on the spaces where the bump foils 20a and 20b are distanced from each other.

When the rotor 8 rotates at the low speed, the top foil 30 keeps its shape by its elasticity. However, as the rotation speed of the rotor 8 increases, the pressure in the bearing becomes high and the top foil 30 deforms outward on the spaces not supported by the bump 2 and eventually the top foil 30 generates lobe shapes L1 and L2 at the high speed.

In this embodiment, the lobe space L2 does not form the perfect lobe shape because the top foil 30 is not continuous thereon. However, it forms lobe shape as a whole.

As the lobes L1 and L2 are formed, the gap between the rotor 8 and the top foil 30 at the lobes L1 and L2 becomes wider while the gap at the other portions becomes narrower. Accordingly, the air in the gap at the other portions rather than the lobes is strongly compressed and the generated air pressure moves the rotor 8 to the center O of the hole 18. As a result, the dynamic stability of the rotor 8 is secured. Also, in this case, the gap between the rotor 8 and the top foil 30 becomes wider by the lobe spaces and friction heat is reduced. As a result, cooling effect is obtained.

Figure 3:
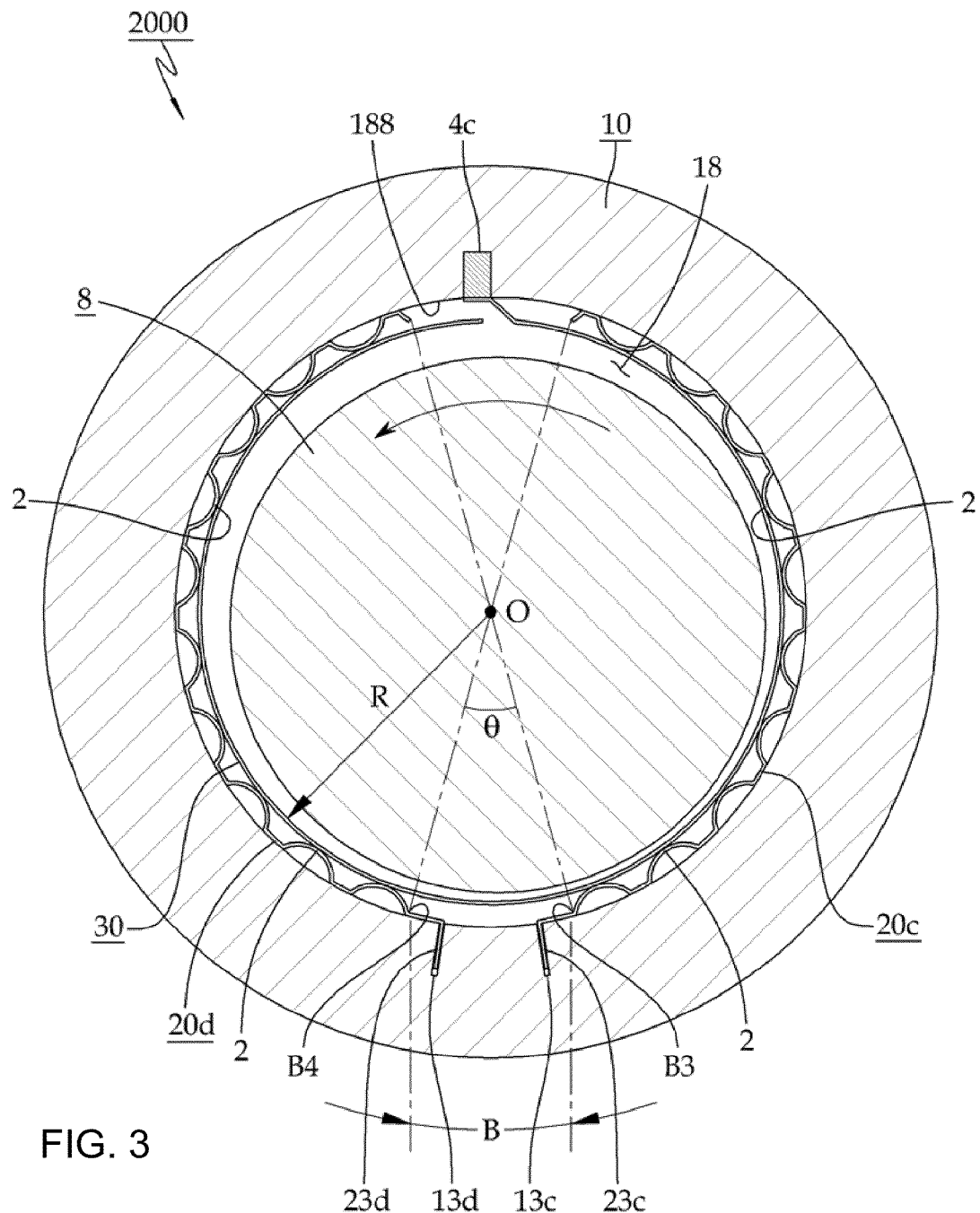
FIGS. 3 and 4 show the structure of a journal foil air bearing in accordance with the second embodiment of the present invention.

FIG. 3 shows a journal foil air bearing 2000 in accordance with the second embodiment of the present invention.

Bump foils 20c and 20d are disposed along the inner periphery 188 of the hole 18 in the bearing housing 10 to be distanced from each other and a top foil 30 is disposed along the top of the bump foils.

The top foil 30 is formed by one foil along the top of the bump foils 20a and 20d. An end of the top foil 30 is secured to a spacer block 4c by the spot welding and the other end forms a free end.

The bump foils 20c and 20d have bent portions (bent end portions) 23c and 23d at their ends, respectively and the bent portions 23c and 23d are inserted into and mounted on slots 13c and 13d formed on the inner periphery 188 of the hole 18 in the bearing housing 10, respectively.

The bump foils 20c and 20d are distanced from each other and the peripheral distance B where a bump 2 is not formed between the bump foils 20c and 20d is determined by the multiplication of the radius R of the hole 18 of the bearing housing 10 and degree of an angle θ formed by spots B3 and B4 at which the bump 2 ends, respectively in the adjacent bump foils 20c and 20d with respect to the center O of the hole 18. It is desirable that the degree of the angle θ lies between 5° and 45°. The reason is the same as that in the first embodiment.

Figure 4:
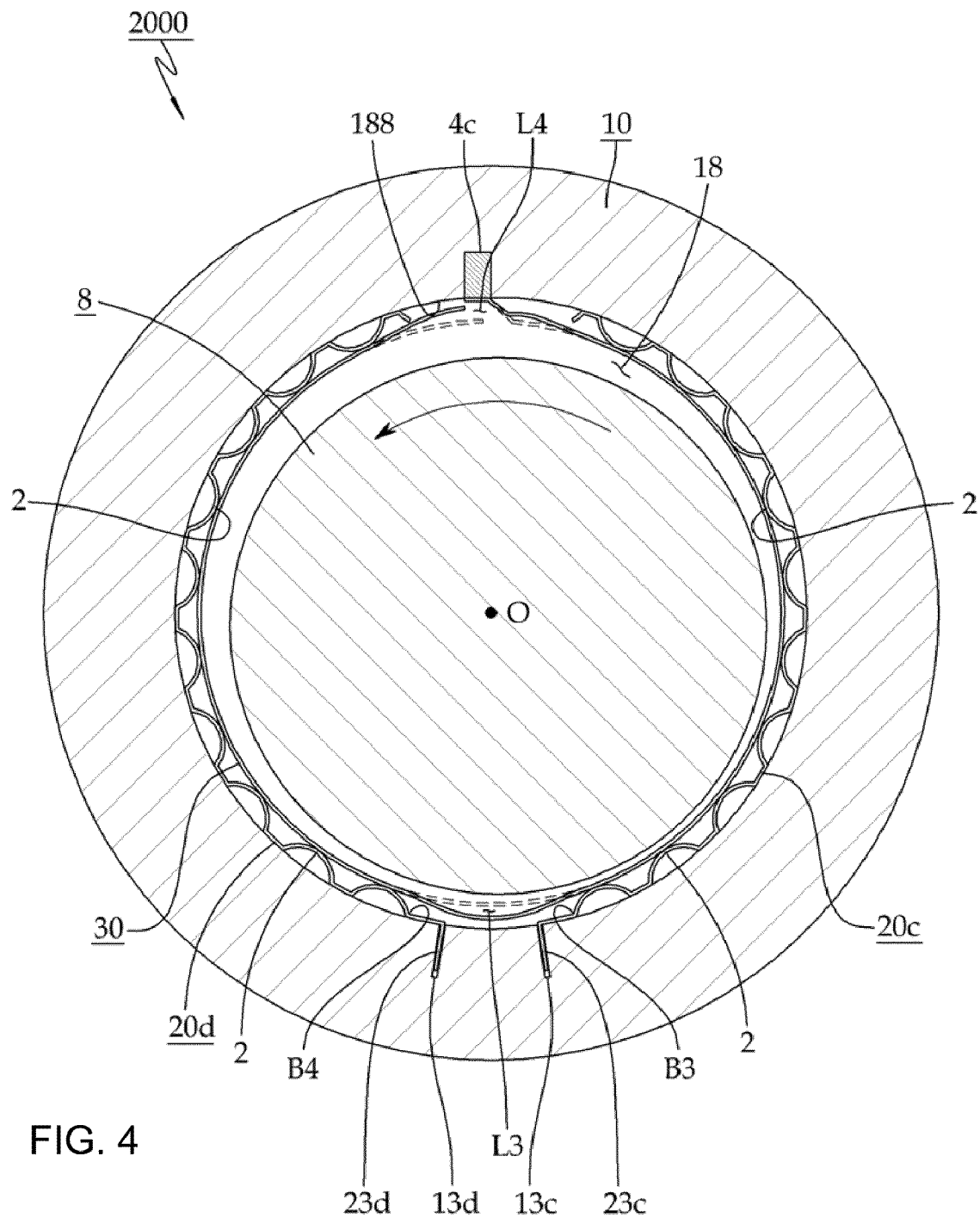

With reference to FIG. 4, when the rotor 8 rotates at the low speed, the top foil 30 keeps its shape by its elasticity. However, as the rotation speed of the rotor 8 increases, the pressure in the bearing becomes high and the top foil 30 deforms outward on the spaces not supported by the bump 2 and eventually the top foil 30 generates lobe shapes L1 and L2 at the high speed. In this embodiment, the lobe space L2 does not form the perfect lobe shape because the top foil 30 is not continuous thereon. However, it forms lobe shape as a whole.

As the lobes L3 and L4 are formed, the gap between the rotor 8 and the top foil 30 at the lobes L3 and L4 becomes wider while the gap at the other portions becomes narrower. Accordingly, the air in the gap at the other portions rather than the lobes is strongly compressed and the generated air pressure moves the rotor 8 to the center O of the hole 18. As a result, the dynamic stability of the rotor 8 is secured. Also, in this case, the gap between the rotor 8 and the top foil 30 become wider by the lobe spaces and the friction heat is reduced. As a result, cooling effect is obtained.

Figure 5:
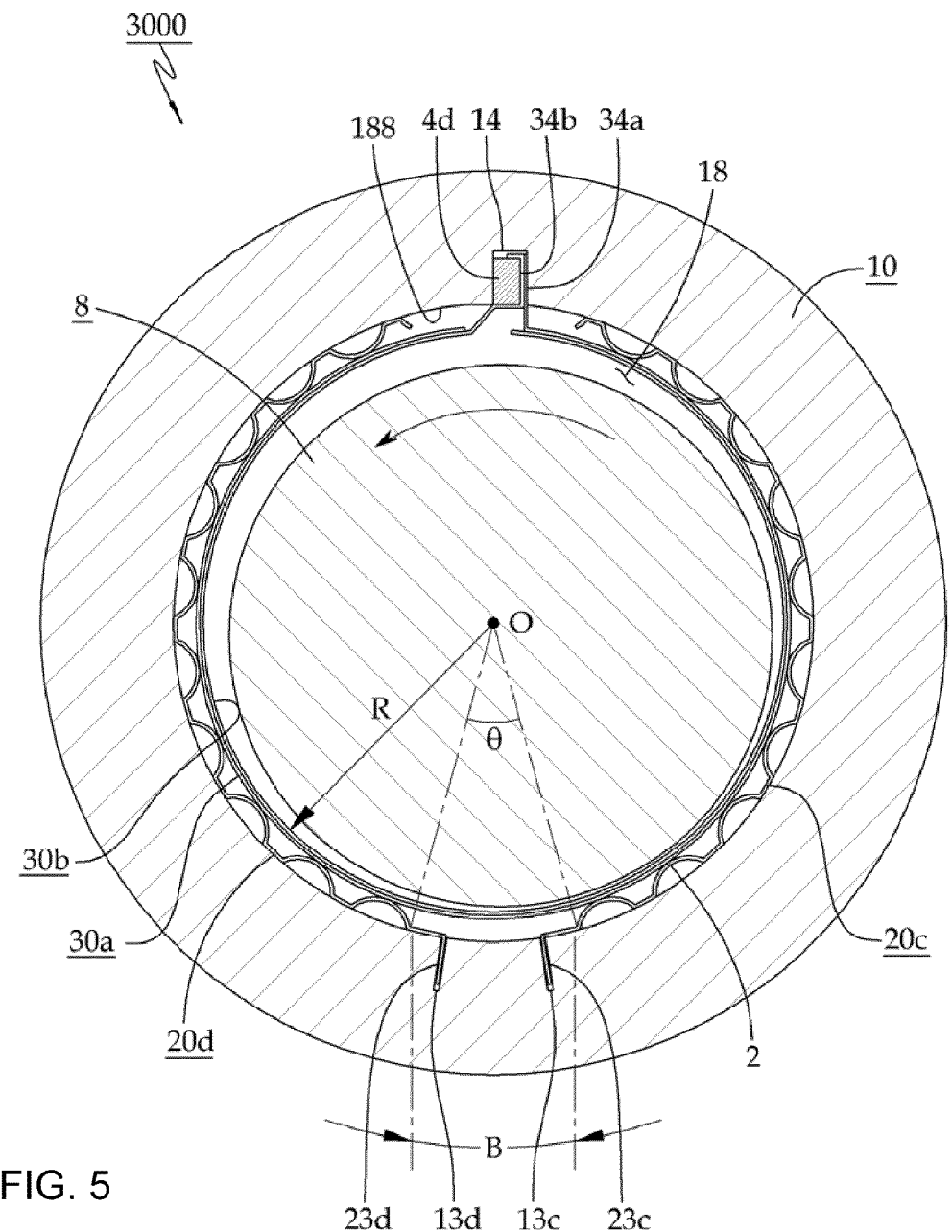
FIG. 5 shows the structure of a journal foil air bearing in accordance with the third embodiment of the present invention.

FIG. 5 shows a journal foil air bearing 3000 in accordance with the third embodiment of the present invention.

In this case, the top foils 30a and 30b which are each provided by one foil along the circumferential direction, respectively are laid one upon another along the radial direction so as to increase the damping.

In this embodiment, a slot 14 is provided in the inner peripheral surface 188 of the hole 18 of the bearing housing 10 and a space block 4d is mounted thereon. Bent portions 34a and 34b of the top foils 30a and 30b are inserted into a clearance between the spacer block 4d and the inner side of the slot 14. The opposite ends from the bent portions 34a and 34b of the top foils 30a and 30b form free ends, respectively.

Figure 6:
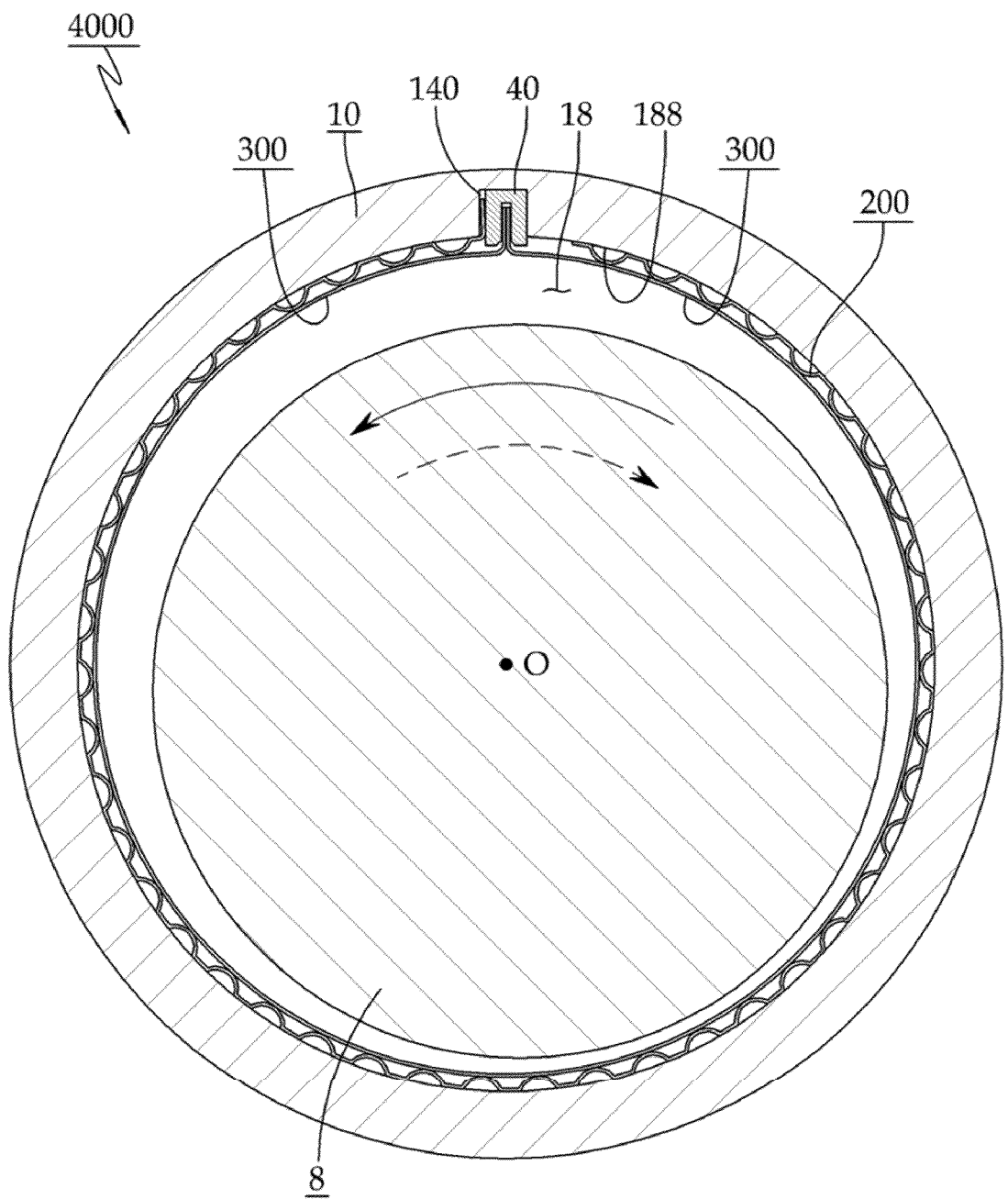
FIGS. 6 to 8 show the structure of a journal foil air bearing in accordance with other aspect of the present invention.

FIG. 6 shows a journal foil air bearing 6000 in accordance with another aspect of the present invention.

A rotor 8 is arranged in a hole 18 in a bearing housing 10 and a bump foil 200 is disposed along the inner periphery 188.

In this case, one bump foil may be provided along the circumferential direction or more than one bump foils may be provided which are distanced from each other as in the aforementioned embodiments. In this embodiment, one bump foil 200 is provided along the circumferential direction.

According to the present invention, one top foil is provided along the circumferential direction and it is disposed along the top of the bump foil. Each end of the top foil has a bent portion which is bent outward. The bent portion is mounted on a slot provided in the inner periphery of the hole in the bearing housing in such a way that it can move elastically in circumferential and radial directions.

Since each of the bent portions can move elastically in circumferential and radial directions in the slot, the top foil can expand in radial direction along its circular shape in response to either of the rotation direction of the rotor. Accordingly, the top foil can accommodate the thermal deformation and the air pressure generated between the rotor and the top foil occurring during the rotation of the rotor regardless of the rotation direction.

In this case, if the top foil is installed in such a way that both bent portions face and contact each other and the top foil is symmetrical with respect to the bent portions, it is desirable.

Figure 7:
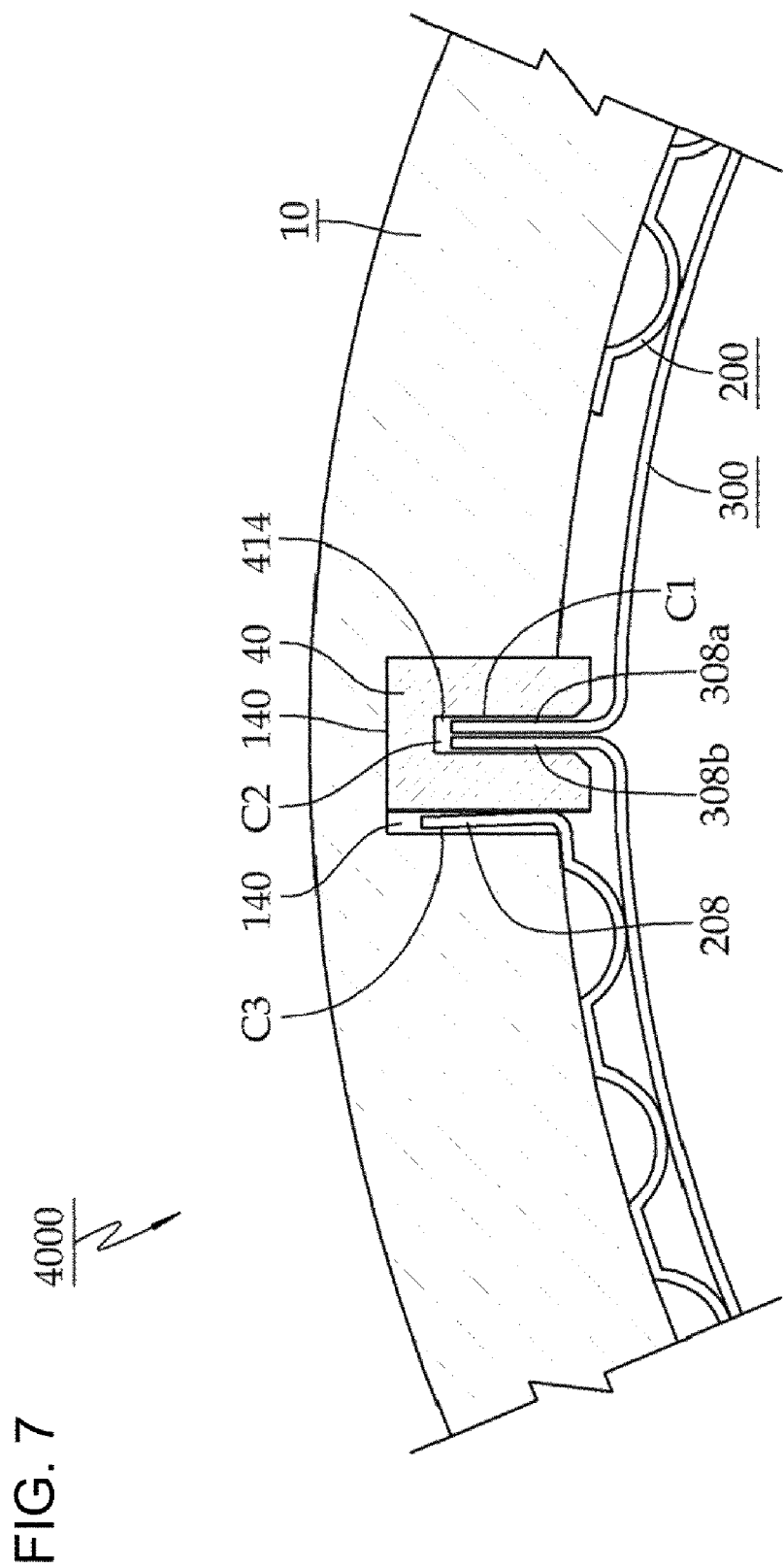

With reference to FIGS. 6 and 7, in this embodiment, both the ends of the top foils 300 form bent portions 308a and 308b which are bent outward, respectively.

Also, a slot 140 is provided in the inner peripheral surface of the hole of the bearing housing and a slot body 40 is mounted thereon. The slot body 140 has a slot 414 and both the bent portions 308a and 308b of the top foil 300 are inserted into and mounted on the slot 414 of the slot body 40 wherein the bent portions 308a and 308b face and contact each other.

In this case, clearances c1 and c2 are formed in the slot 414 of the slot body 40 where the bent portions 308a and 308b can move elastically in the circumferential and radial directions.

Also, in this embodiment, the slot body 40 and a bent portion 208 of an end of the bump foil 200 are inserted into the slot 140 provided in the inner peripheral surface 188 of the hole 18 in the bearing housing 10 to be in contact with each other. A clearance c3 is formed in the slot 140 where the slot body 40 can move elastically in the circumferential direction.

Both the ends of the top foil 300 are supported in the slot 414 and can move elastically in the circumferential c1 and radial c2 directions. Accordingly, the top foil 300 can expand in the radial direction regardless of the rotation direction of the rotor and it can accommodate the expansion caused by the thermal deformation and the increase of the pressure, all which are caused by the rotation of the rotor, regardless of the rotation direction. That is, the rotation direction of the rotor 8 has not any effects.

Especially, in this case, since the slot 140 has the clearance c3 for the slot body 40, it is possible to deal with the rotation of the rotor more elastically.

Figure 8:
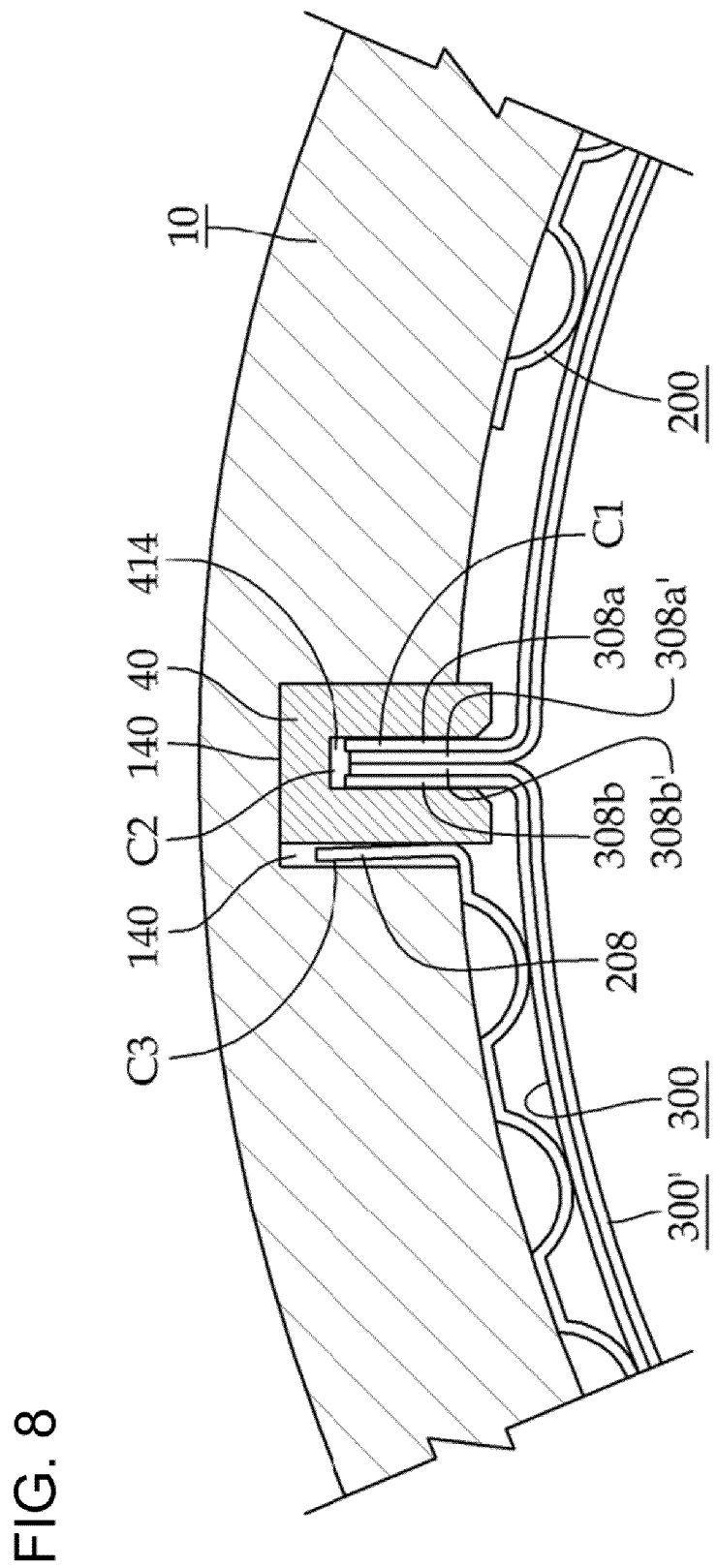

According to the present invention, the top foil provided by one foil in the circumferential direction may be provided by plural number in the radial direction and they are piled each other to increase the damping. That is, as shown in FIG. 8, the top foils 300 and 300' provided by one foil in the circumferential direction, respectively, are laid one upon another. In this case, bent portions 308a and 308b and 308a' and 308b' of both ends of each of the top foil 300 or 300' are inserted into the slot 414 of the slot body 40 and mounted thereon.

Figure 9:
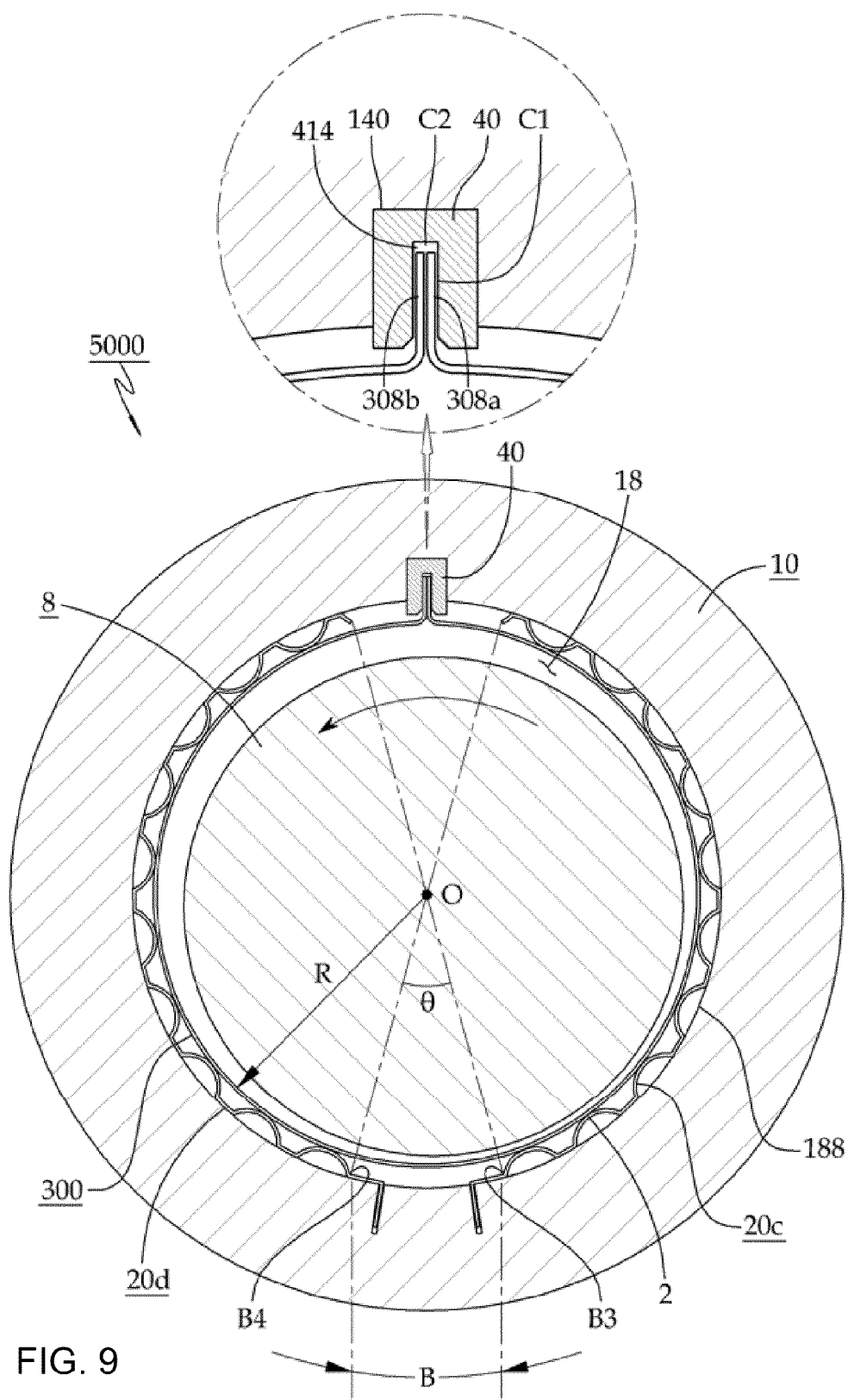
FIG. 9 shows the structure of a journal foil air bearing in accordance with another aspect of the present invention.

According to the present invention, it is possible to enhance dynamic stability of a rotor at its high speed rotation and permit both rotational direction of the rotor as well. For this, the present invention provides at least two bump foils distanced from each other along inner periphery of a hole in a bearing housing and one top foil in circumferential direction in which bent portions at both ends of the top foil are mounted in a slot provided in the inner periphery of the hole in the bearing housing to be elastically movable in circumferential and radial directions. FIG. 9 shows an embodiment for this case.

In this case, a slot body 40 is mounted on a slot 140 provided in the inner periphery 188 of a hole 18 in a bearing housing 10. Bent portions 308a and 308b formed in both ends of a top foil 300 provided by one foil in the circumferential direction are inserted into a slot 414 provided in the slot body 40. In this case, clearances c1 and c2 are formed in the slot 414 of the slot body 40 so that the bent portions 308a and 308b can move elastically therein in the circumferential and radial directions.

Bump foils 20c and 20d are disposed to be distanced from each other along the inner periphery 188 of the hole in the bearing housing 10. The peripheral distance B where the bump 2 is not formed between the bump foils 20c and 20d is determined by the multiplication of the radius R of the hole 18 of the bearing housing 10 and degree of an angle $\theta$ formed by spots B3 and B4 at which the bump 2 ends, respectively in the adjacent bump foils 20c and 20d with respect to the center O of the hole 18. The degree of an angle $\theta$ lies between 5° and 45°.

By aforementioned structure, the top foil 300 can expand in the radial direction regardless of the rotation direction of the rotor 8 and can accommodate both rotational directions of the rotor 8. Also, the top foil 300 deforms outward and generates lobes on the spaces where the bump foils 20c and 20d are distanced from each other and the dynamic stability is enhanced.

Accordingly, the present invention accommodates both of the rotational direction of the rotor and enhances the dynamic stability as well.

According to the present invention, a plurality of bump foils is provided and they are distanced from each other along the inner periphery of the hole in the bearing housing. This structure leads to the deformation of a top foil at the spaces where the bump foils are distanced from each other as the rotor rotates at the high speed and generates lobes on the spaces. Accordingly, the dynamic stability is secured. In this case, determination of the locations and the number of the bump foils and the peripheral distance where the bump is not formed between the bump foils results in the size and location of the lobes. Accordingly, the dynamic stability of the rotor is easily secured.

In the embodiments, two bump foils which are distanced from each other along the inner periphery of the hole in the bearing housing are provided. However, more than two bump foils may be provided.

As aforementioned, the present invention provides a journal foil air bearing which provides one top foil structure not only to reduce the number of components and minimize the exposure of a fixed portion of the top foil, but also to permit the rotation of the rotor in both directions and bump foil structure to generate lobes. By the journal foil air bearing, it is possible to provide facilities in assembly and installation, prevent the bearing from being damaged by the rotation of the rotor in the unintended direction, and enhance the dynamic stability of a rotor at high speed.

Therefore, it is understood that the purpose of the present invention is accomplished. The present invention is described with reference to the specific embodiments, but the invention is not limited thereto. Only the following claims will determine the scope of the invention.

What is claimed is:

1. A journal foil air bearing comprising:
a bearing housing provided with a hole in which a rotor is arranged;
at least two bump foils disposed to be distanced from each other along an inner periphery of the hole in the bearing housing; and
a top foil provided by one foil along a circumferential direction and disposed along the top of the bump foils;
whereby the top foil deforms outward on spaces where the bump foils are distanced from each other and forms lobe shapes thereon at high speed rotation of the rotor.

2. The journal foil air bearing as claimed in claim 1 wherein a peripheral distance where a bump is not formed between the bump foils is determined by multiplication of a radius of the hole in the bearing housing and a degree of an angle formed by spots at which bumps end in adjacent ones of the bump foils with respect to center of the hole and the degree of the angle lies between 5° and 45°.

3. The journal foil air bearing as claimed in claim 1 wherein said top foil comprises a plurality of top foils along a radial direction laid one upon another.

4. The journal foil air bearing as claimed in claim 1 wherein the top foil has bent portions at both ends and the bent portions are mounted in a slot provided in the inner periphery of the hole in the bearing housing to be elastically movable therein in the circumferential and radial directions.

5. The journal foil air bearing as claimed in claim 4 wherein the top foil is installed in such a way that both bent portions face and contact each other in the slot and the top foil is symmetrical with respect to the bent portions.

6. The journal foil air bearing as claimed in claim 5 wherein a slot body having a slot is mounted in the slot in the inner periphery of the hole in the bearing housing and the bent portions at both ends of the top foil are mounted on the slot in the slot body and, at this time, clearances are formed in the slot in the slot body where the bent portions can move elastically in the circumferential and radial directions.

7. The journal foil air bearing as claimed in claim 6 wherein the slot body and a bent portion of an end of the bump foil are inserted into and mounted in the slot in the inner periphery of the hole in the bearing housing to be in contact with each other and a clearance is formed in the slot in the inner periphery of the hole in the bearing housing where the slot body can move elastically in the circumferential direction.

8. A journal foil air bearing comprising:
a bearing housing provided with a hole in which a rotor is arranged;

a bump foil disposed along an inner periphery of the hole in the bearing housing; and a top foil provided by one foil along a circumferential direction and disposed along the top of the bump foil, wherein:

the top foil has bent portions at both ends and the bent portions are mounted on a slot provided in the inner periphery of the hole in the bearing housing to be elastically movable therein in circumferential and radial directions; and the top foil is installed in such a way that both bent portions face and contact each other in the slot and the top foil is symmetrical with respect to the bent portions.

9. The journal foil air bearing as claimed in claim 8 wherein a slot body having a slot is mounted in the slot in the inner periphery of the hole in the bearing housing and the bent portions are mounted on the slot in the slot body and, at this time, clearances are formed in the slot in the slot body so that the bent portions can move elastically in the circumferential and radial directions.

10. The journal foil air bearing as claimed in claim 9 wherein the slot body and a bent portion of an end of the bump foil are inserted into and mounted on the slot in the inner periphery of the hole in the bearing housing to be in contact with each other and a clearance is formed in the slot in the inner periphery of the hole in the bearing housing so that the slot body can move elastically in the circumferential direction.

11. The journal foil air bearing as claimed in claim 8 wherein said top foil comprises a plurality of top foils along a radial direction laid one upon another.

* * * * *